Aug. 27, 1963    H. M. CHRISTENSEN    3,102,077
PREPARATION OF INSULIN CONTAINING 2.75 TO 8% ZINC CONTENT
Filed Oct. 27, 1960    5 Sheets-Sheet 1

FIG I

Henry Marinus Christensen
INVENTOR
BY
ATTORNEYS

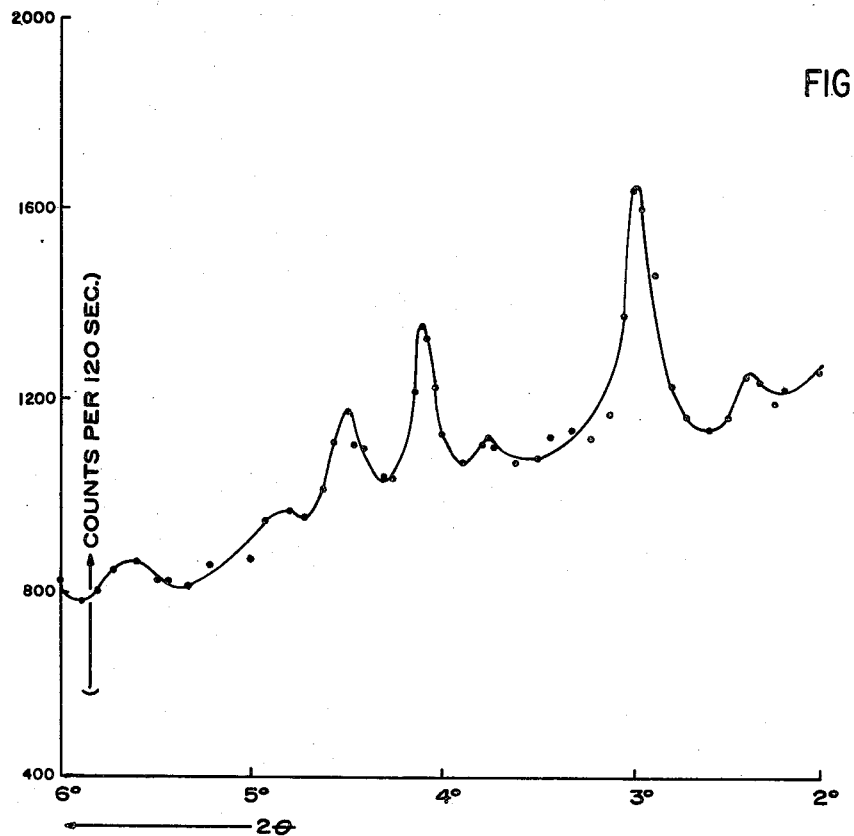
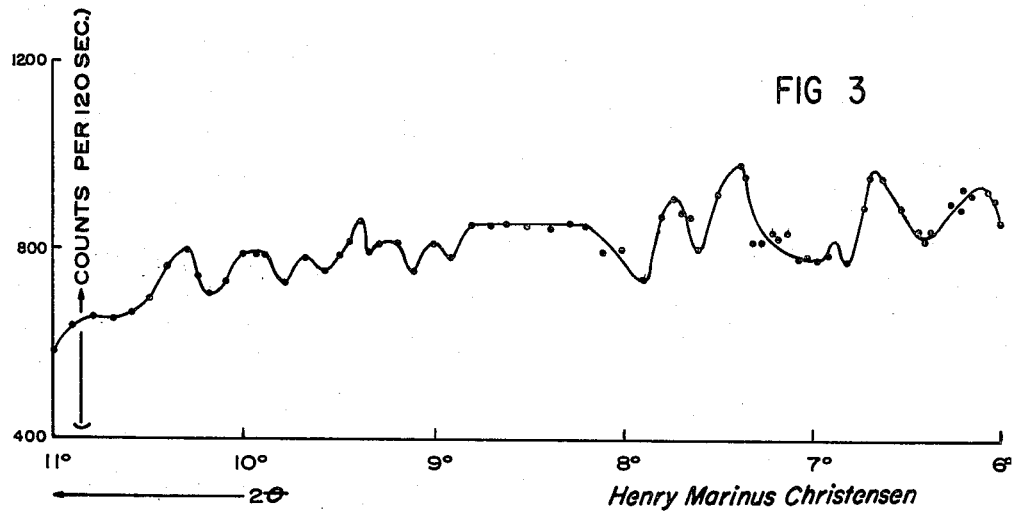
FIG 2
FIG 3
Henry Marinus Christensen
INVENTOR

Aug. 27, 1963　　　H. M. CHRISTENSEN　　　3,102,077
PREPARATION OF INSULIN CONTAINING 2.75 TO 8% ZINC CONTENT
Filed Oct. 27, 1960　　　　　　　　　　5 Sheets-Sheet 3
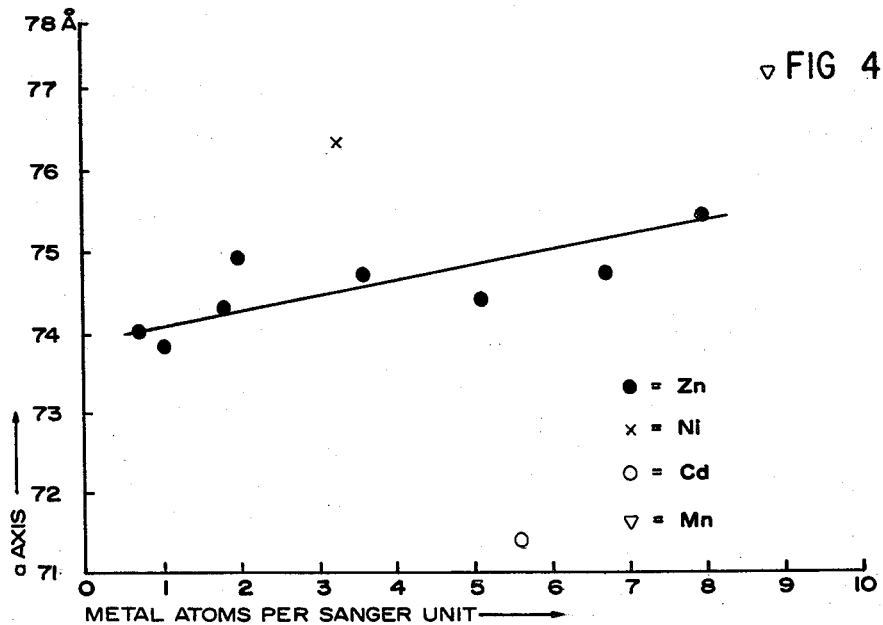
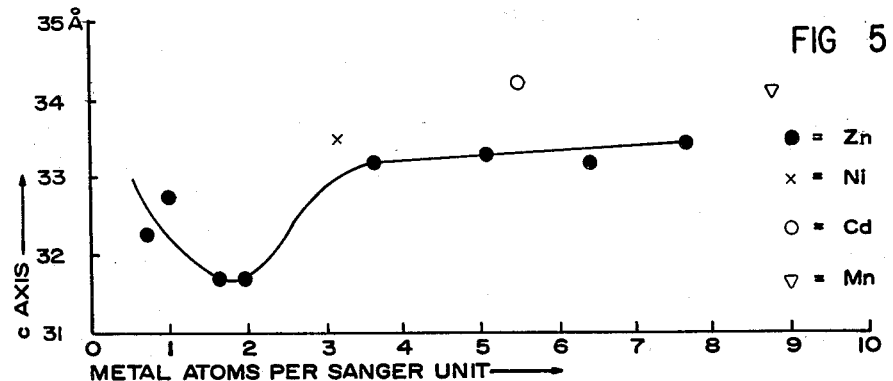
Henry Marinus Christensen
INVENTOR
BY Henderoth, Lind, & Ponack
ATTORNEYS

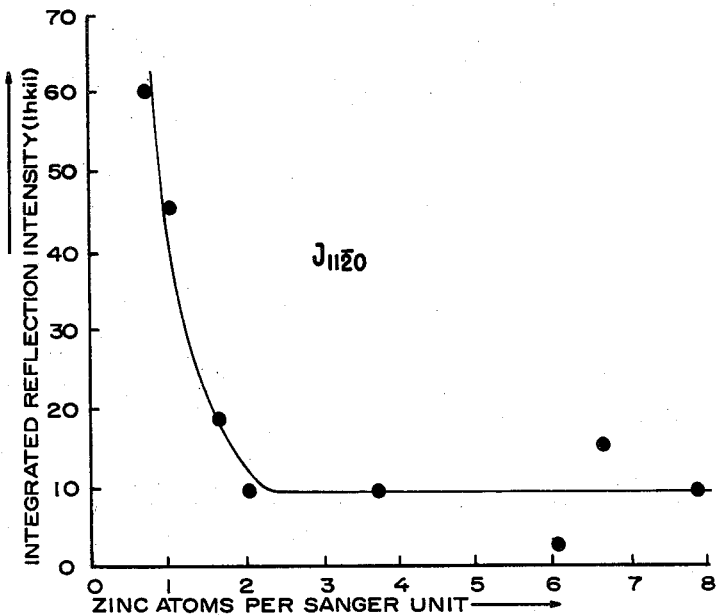
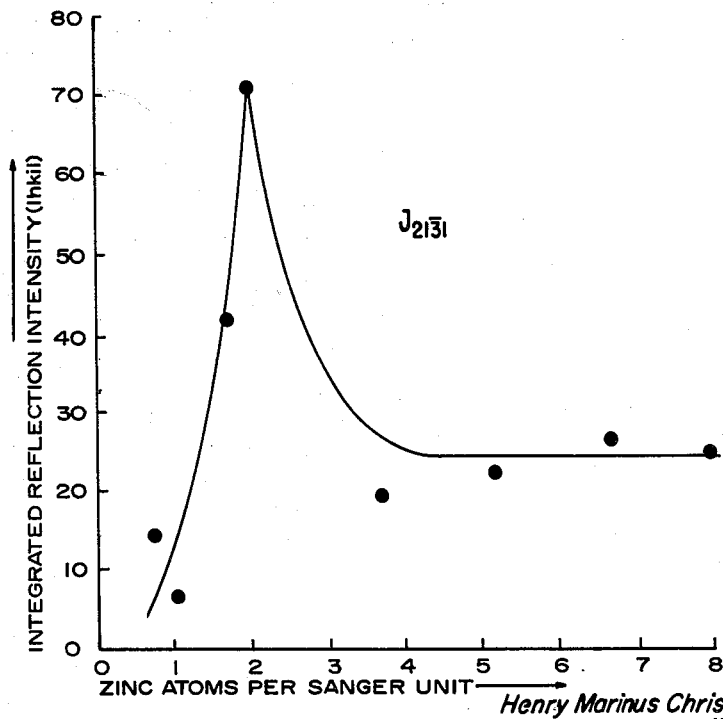

United States Patent Office 3,102,077
Patented Aug. 27, 1963

3,102,077
PREPARATION OF INSULIN CONTAINING
2.75 TO 8 PERCENT ZINC CONTENT
Henry Marinus Christensen, Frederiksborgvej 107,
Roskilde, Denmark
Filed Oct. 27, 1960, Ser. No. 65,408
Claims priority, application Denmark Aug. 19, 1953
11 Claims. (Cl. 167—75)

This invention relates to new zinc-containing insulin compounds and to a process for preparing the same.

This application is a continuation-in-part of my co-pending patent applications Serial Nos. 447,436 filed on August 2, 1954; 742,502 and 742,477 both filed on June 17, 1958 and 783,571 filed on December 29, 1958, all of which are now abandoned.

It is the object of my invention to provide new zinc-containing insulin compounds having a prolonged insulin-effect superior to that of the hitherto known zinc-containing insulin preparations.

It is a known art to produce insulin with increased zinc content in both crystalline and amorphous form by adding insulin to aqueous media in which it is insoluble or only slightly soluble and which contain a zinc salt and have a pH-value of 6–7, contingently with addition of up to 15% by volume of organic solvents, in order to dissolve the amorphous insulin and promote crystallization.

It is further known to prepare injectable suspensions or solutions of insulin, as well as insulin globin, insulin protamin, and insulin methylalbumin with different zinc contents and as well from insulin in amorphous as in crystalline form. The compounds can contain up to a maximum of 2.2 to 2.3% zinc and corresponding amounts of some other metals, such as calcium, magnesium, manganese, iron, cobalt; nickel and cadmium bound to the insulin.

In the following there are especially discussed new zinc insulin compounds, as zinc is by far the most important metal in combination with insulin.

In the hitherto known aqueous suspensions of such zinc insulins it has not been possible either by varying pH, adding a large surplus of zinc, or by other means to bring the chemically bound zinc content of the zinc up over the stated maximum value.

The known zinc insulin is a preparation of the active antidiabetic principle of the internal secretion of the islands of Langerhans of the pancreas. It normally contains 0.4 to 0.9% of zinc, and it is possible to augment this zinc content up to 2.3% by treating the normal insulin with zinc salts in the above said aqueous media.

In the animal body, the highest concentration of zinc is found in the pancreas. Moreover, zinc is invariably present in all samples of crystalline insulin. In fact, it has been reported that it is impossible to crystallize insulin in the absence of zinc, nickel and cadmium, which normally are found in pancreas, and some other metals such as calcium, magnesium, manganese, iron and copper.

Such zinc-containing insulin and methods for its production have been described, for instance, in the patents to Petersen et al. Nos. 2,882,202 and 2,882,203 issued both on April 14, 1959. Zinc-insulin compounds having varying zinc contents in the order of 2% by weight and maximally 2.7% are described in these patents. However, the zinc content in these products exceeding 2.2 to 2.3% is not chemically bound, but only adsorbed or occluded, i.e. not built in a regular pattern in the lattice of the zinc insulin elementary cell, as is demonstrated by the following facts.

When the known crystalline or amorphous zinc insulins after being isolated are suspended in water or known buffer solutions for injection, they will all give off zinc to the water in a quantity related to the zinc originally bound to the insulin. However, it has never been possible in any hitherto known aqueous suspension of zinc-insulin—amorphous or crystalline—to maintain more than 2.2 to 2.3% zinc chemically bound to the insulin. Thus insulin with a chemically bound content of 7% zinc will when suspended in zinc free water to a concentration of e.g. 40 international units per ml. dissociate almost 5% of this amount of zinc to the aqueous liquid containing the suspension, the zinc excess above 2.2 to 2.3% being loosely bound in the crystals. When zinc insulin containing 2.2 to 2.3% zinc is suspended in zinc-free water to the said concentration it will dissociate 0.8 to 0.9% zinc.

The importance of the zinc content in insulin has long been known, and in practice use has been made of suspensions in water of zinc-insulin with about 2% zinc chemically bound to crystals and to amorphous insulin. Both forms are insoluble and retain up to about 2.2% zinc content in water with pH 7 in the presence of a surplus of zinc ions.

The insulin preparations here mentioned have, when injected into diabetic patients, had a retarded effect of up to 36 hours in some cases. But in practice one is, on practical grounds, satisfied with an effect of 24 hours.

I have now discovered that this present stage of the technique of zinc-insulin preparation can be considerably improved by producing, for example zinc-insulin in amorphous or crystalline form with a chemically bound zinc content of as high up as 6% and even up to about 8%.

In the known processes, insulin and a water-soluble zinc salt such as zinc chloride are reacted in water as the reaction medium. For promoting the crystallization, only mixtures of water have been used, such mixtures being maximally about 15% by volume of organic solvents, at a pH of about 4 to 8 preferably between 5.0 and 7.0. These processes lead to the formation of zinc insulins in which maximally two zinc atoms are chemically bonded to the acid groups of the insulin molecule, by replacing hydrogen atoms of the carboxylic groups or to the imidazole rings of the aforesaid histidyl residues. (Waitzel, "Angewandte Chemi" 68, 569 (1956) citing K. Hallas-Möller et al. "Ugeskrift f. Laeger" SZ, 1761 (1951).)

Under the above-mentioned conditions of the known processes, the affinity of the zinc to the insulin is greater than the affinity of the zinc for the acid or hydroxyl groups from the aqueous reaction medium, until about 2.3% by weight of zinc has been bound in the above-described manner by insulin corresponding to about 2.2 gram atoms of zinc per mole of zinc insulin. By the known methods it was thus possible to prepare zinc insulin with a content of, in practice, about 2.3% of zinc bound by the said groups of the insulin in the form of a salt which may be considered a zinc insulinate. My invention makes it possible to prepare new zinc-insulin compounds which contain from about 2.3 up to 8% of zinc chemically bound in a different manner to the insulin.

These unexpectedly high zinc contents in zinc insulin, and a highly superior prolonged effect of the new zinc-insulin compounds, are obtained surprisingly by the process according to my present invention which comprises reacting insulin with soluble zinc salt such as, preferably, zinc chloride, or zinc bromide or zinc acetate, in a solution in a solvent which is chemically inert to insulin and to the new zinc-insulin compound being formed, and which solvent is selected from the group consisting of:

Anhydrous lower alkyl alcohols such as methyl alcohol, ethyl alcohol, propyl alcohol; aqueous mixtures of the same alcohols having an alcohol content of above 15% by weight and preferably much higher, usually above 50%;

Anhydrous lower aralyl alcohols such as benzyl alcohol;

Anhydrous lower mononuclear aryl compounds having directly substituted hydroxy groups alone or together with lower alkyl substituents at the benzene ring, such as phenol, cresols and the like;

Weak organic nitrogen-containing bases such as primary lower alkyl amines and pyridines; these last-mentioned bases may also be used in mixture with water, and preferably, in the latter case, in the presence of an ammonia-ammonium chloride complex compound, $$NH_3.NH_4Cl$$

which is added in order to avoid the formation and precipitation of zinc hydroxide;

Finally, there can be used as solvents lower carboxylic acids such as glacial acetic acid, propionic acid, glycolic acid and lactic acid, again, when used in mixture with water, preferably in the presence of the aforesaid ammonia-ammonium chloride compound.

Whenever the above-described solvent contains water, the amount of the latter in the solvent mixture must always be less than 85% and in most cases less than 50%.

To summarize, any organic solvent is suitable for the process of my invention, if it does not react with insulin and the zinc-insulins being formed, and if it is a solvent for the zinc salt used in the reaction with insulin.

According to another feature of the invention, the solvent used is one in which the insulin is soluble; the insulin can also be used in solution in a mixture of several of the said solvents.

According to another mode of the process of the invention, insulin is brought in solid form into reaction with one of the described zinc salt solutions by suspending it therein. The crystalline or amorphous insulin particles will easily combine with the dissolved zinc compounds.

By employing aqueous media it may be expedient to add a substance, such as $NH_3$—$NH_4Cl$, to avoid precipitation of zinc hydroxide.

The entire process may, of course, be carried out under sterile conditions.

The result of the present method is that, in contradistinction to previously known methods, it is possible in a reliable and simple manner to control the quantity of zinc adsorbed in the insulin and, more particularly, to prepare e.g. crystalline zinc chlorine insulins with increased content of zinc suspended e.g. in glycerides of the fatty acids and vastly prolonged antidiabetic effect.

When crystalline zinc chlorine insulins containing 2.3 to about 8% of zinc are suspended in zinc free water to a concentration of 40 i.u. per ml. they will separate zinc chloride. If the zinc chlorine insulin contains 2.3% to about 5 or 6% zinc the remaining precipitate of zinc insulin will contain 1.4 to 2.3% zinc. If zinc chlorine insulin containing higher zinc contents than the said 5 to 6% of zinc, the precipitate of zinc insulin will retain 2.3% of zinc.

In the process according to my invention, the reaction mixture containing the two main reactants, i.e. insulin and the metal salt, as well as the solvent is stirred for some time, usually for some hours, the precipitated crystals of the new zinc insulin or corresponding other metal insulins are separated, for instance by filtration, washed with the solvent or, preferably, with absolute ethyl alcohol, and finally dried.

The new zinc compounds prepared according to the above-described process of my invention differ from the hitherto known zinc insulins in a number of features:

In the insulin molecule there are bonded zinc atoms in amount ranging from above 2.3 to about 8% by weight and even somewhat higher, corresponding to about 2 to 8 gram atoms of zinc per mole of zinc insulin, together with a content of halogen, for instance, chlorine, bromine or iodine, or another monovalent anion such as acetate, depending on the composition of the zinc salt used, which ranges from about 3 or less to 12 gram atoms of halogen per mole of zinc-insulin. This halogen content corresponds stoichiometrically to the content of zinc or other metal gram atoms exceeding 2 in the new zinc insulins.

The new zinc-insulins differ significantly from the known ones, in their crystallographic characteristics, in that the lattice constants determined by X-ray diffraction vary differently from those of the known zinc insulins with changes of the zinc content. For instance, while the $a$-axis of the elementary crystal cell increases slowly in both the new and the known zinc insulins with increasing zinc content, the $c$-axis of the elementary cell which decreases in the known zinc insulins with increasing zinc content from above 33 to about 31.8 angstroms, corresponding to a zinc content of 2.3 to 2.5% by weight, shows in the new compounds an increase with increasing zinc content. Thus, the $c$-axis is about 32 angstroms long at a zinc content of about 2.75% in the new zinc insulins according to the invention, reaches a length of about 33.3 angstroms at a zinc content of about 4 gram atoms of zinc per zinc insulin molecule, and then remains substantially constant at 33.3 to 33.5 angstroms up to the maximum content of about 8 gram atoms of zinc in the new compounds. The new compounds with the highest zinc content have been found to correspond to the stoichiometrical composition $Insulin.Zn_8Cl_{12}$. Other compositions determined thus far are $Insulin.Zn_7Cl_{10}$ and $Insulin.Zn_5Cl_6$. The general formula for these compounds is therefore $$Insulin.Zn_{m+2}X_{2m}$$

wherein X is a monovalent anion, preferable chlorine, and $m$ is a positive number up to and including 6. A zinc insulin bromide and a zinc insulin acetate have also been produced by using as starting material zinc bromide and insulin or zinc acetate and insulin, respectively. The monovalent anion X in the formula given above need therefore not be a halogen, but can also be acetate.

All percentages given in this application are by weight calcuated on the basis of the total weight of the respective new zinc insulin compound produced.

The formulas of the new compounds were calculated as follows:

The molecular weight of the insulin portion of the new compounds was set at about 6000 which is the Sanger unit of 5778 plus 6% added to take into account the water content of dry insulin. This water is not water of crystallization since it does not effect the lattice constants discussed hereinbefore, i.e. it is not settled periodically in the lattice.

The total molecular weight P of the new zinc insulins having the general formula $$Insulin.Zn_{m+2}X_{2m}$$

is therefore, in rounded figures (atomic weight of zinc=65)

(I) $\qquad P = 6000 + (m+2).65 + 2m.X'$

X' being the atomic or molecular weight of the respective anion. The number of atoms of zinc in the new zinc insulin molecule can be calculated from the determined percentage by weight y of zinc in the new compound as follows. The zinc content corresponds to the formula:

(II) $\qquad (m+2).65 = \dfrac{y \cdot P}{100}$

Resolving this equation for P and setting the left side of this equation equal to the right side of Formula I for P above yields the following equation for $m$:

(III) $\qquad m = \dfrac{6130 - \dfrac{13000}{y}}{\dfrac{6500}{y} - 65 - 2X'}$

It will be noted that for a limit value of $y=2.12$ (or 2.2 if 5778 is taken as the insulin molecule instead of 6000)

the value of m in Formula III is zero. This corresponds perfectly to the saturation value of 2.2 for zinc incorporated in insulin which has been mentioned frequently in the recent literature (see Weitzel, supra.)

The above-mentioned crystallographic data as well as other properties of the new compounds are illustrated by the graphs shown in the accompanying drawings of which FIG. 1 is an X-ray powder diagram of air-dried zinc-insulin crystals containing 6.8 atoms of zinc per mole (Sanger unit) of insulin. Using automatic recordings, the innermost part of a powder diagram taken with Geiger-Mueller diffractometer was traced from $2\Theta=2°$ to $2\Theta=6°$. CuKa radiation was applied, with automatic recording.

FIG. 2 is an X-ray powder diagram of the same material as used in FIG. 1 and under the same conditions, but with a stationary 120-second counting at intervals of 0.5 to 0.10° in $2\Theta$.

FIG. 3 is a powder diagram of air dried zinc-insulin crystals of a zinc content as used in FIGS. 1 and 2, and taken under the conditions of FIG. 2, but with $2\Theta$ ranging from 6° to 11°.

FIG. 4 is a graph illustrating the above-discussed variation of the a-axis of the elementary cell of zinc-insulin crystals with varying zinc content.

FIG. 5 is a graph illustrating the above-discussed variation of the c-axis of the same elementary cell with varying zinc content, and FIGS. 6a to 6d are graphs showing the integrated reflection intensities with increasing zinc content for the innermost lines in the powder diagram shown in FIG. 3 above.

These last-mentioned figures show integrated intensities measured as peak area over a smoothed background. Curves 6a, 6b, 6c and 6d indicate a break at about 2 zinc atoms per insulin molecule and curves 6b, 6c or 6d another break at about 4 atoms of zinc per zinc-insulin molecule, which confirms the above-described changes in the length of the c-axis of the zinc-insulin elementary cell with increasing zinc content. No significant variation occurs at higher values.

The break at 2 atoms of zinc has been explained above as being due to the fact, confirmed by chemical analysis, that at this point the reaction between insulin crystals and for instance, the organic zinc chloride solution according to the process of my invention sets in, as a simultaneous incorporation of zinc and chloride ions in the insulin molecule, while below the limit of about 2 atoms of zinc per molecule, exclusively zinc is incorpated by ion exchange for hydrogen from the insulin carboxylic acid groups.

The first two zinc atoms taken up together with stoichiometrically corresponding amounts of chlorine in the range above the minimum of 2 and up to the second break corresponding to a total content of 4 zinc atoms in the new zinc-insulin molecule are also placed in fixed positions in the elementary cell. Otherwise, the drastic changes in reflexion intensity shown by graphs 6b, 6c and 6d would not occur. These novel products having a zinc content above 2 atoms per molecule and a chlorine content of 2n atoms for every n zinc atom in excess of 2 are therefore chemical compounds.

The reaction between insulin crystals and soluble zinc salts in preponderantly organic, inert solvents, according to the process of my invention, is therefore a three stage process, depending on the proportions of the reactants employed.

In the first stage there are produced the well known zinc insulins having a zinc content of up to about 2 atoms of Zn per zinc insulin molecule, corresponding to about 2.2% to 2.3% by weight of zinc.

In the second stage there are formed the above-described novel compounds having above 2 and up to 4 zinc atoms per molecule as well as monovalent anions and corresponding to the formula.

Figure 6C:
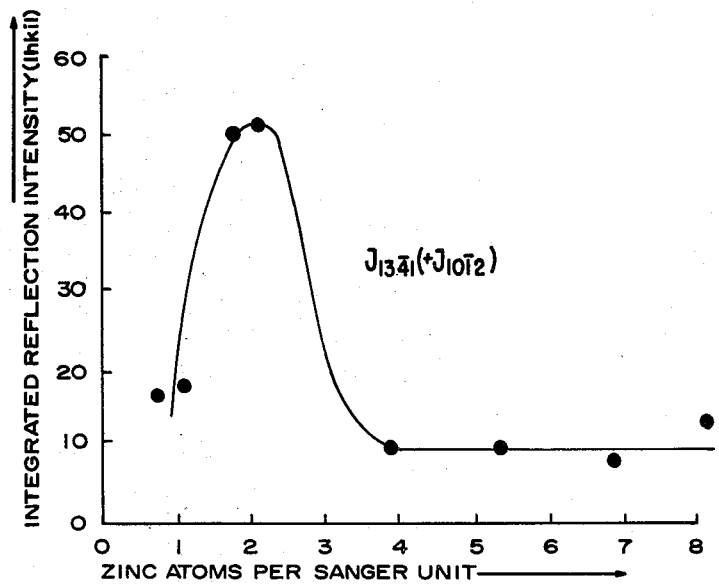
Figure 6D:
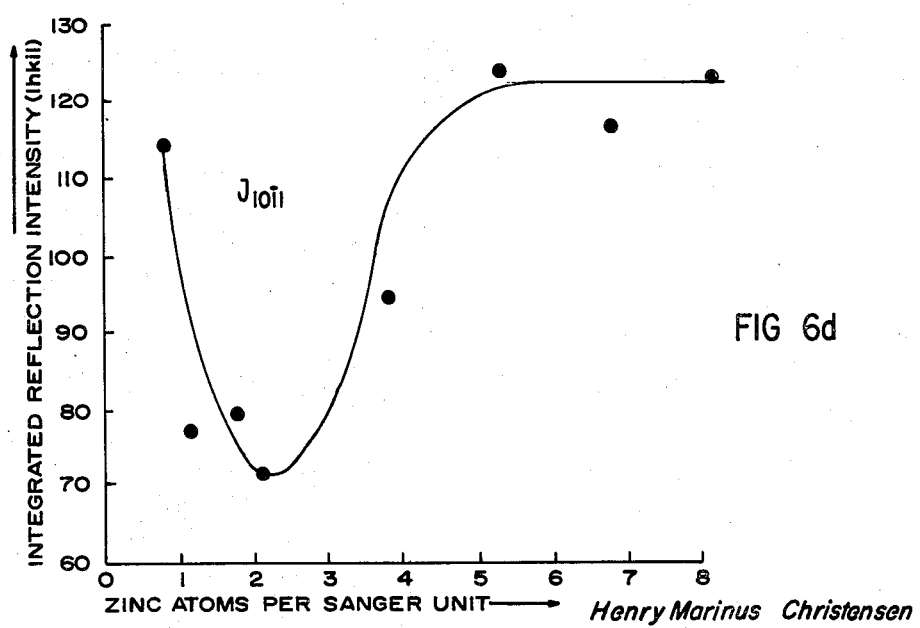

Insulin.$Zn_{m+2}X_{2m}$ in which, for this second stage, m is a positive number up to about 2. The limit compound obtained in this second stage will therefore have, in the case of zinc chloride as one of the two reactants, the formula Insulin.$Zn_4Cl_4$ In the third stage, further zinc and anions are incorporated in the zinc insulin, however, in a different manner which is characterized by the fact that the c-axis of the elementary cell remains constant at about 33.3 angstroms, while the a-axis continues to increase, and that the reflexion intensities in this range remain also constant (FIGS. 6b, 6c and 6d).

On the other hand, the single break in the curve of FIG. 6a shows that the novel compounds with above 2 up to about 8 zinc atoms and with anions, according to the invention, have common properties which differentiate them from the known compounds having up to about 2 atoms of zinc per zinc-insulin molecule, but no anions incorporated therein. The new zinc compounds may also be formulated as Insulin.$Zn_2.(ZnX_2)_q$ wherein q is a positive number up to 6.

Figure 1:
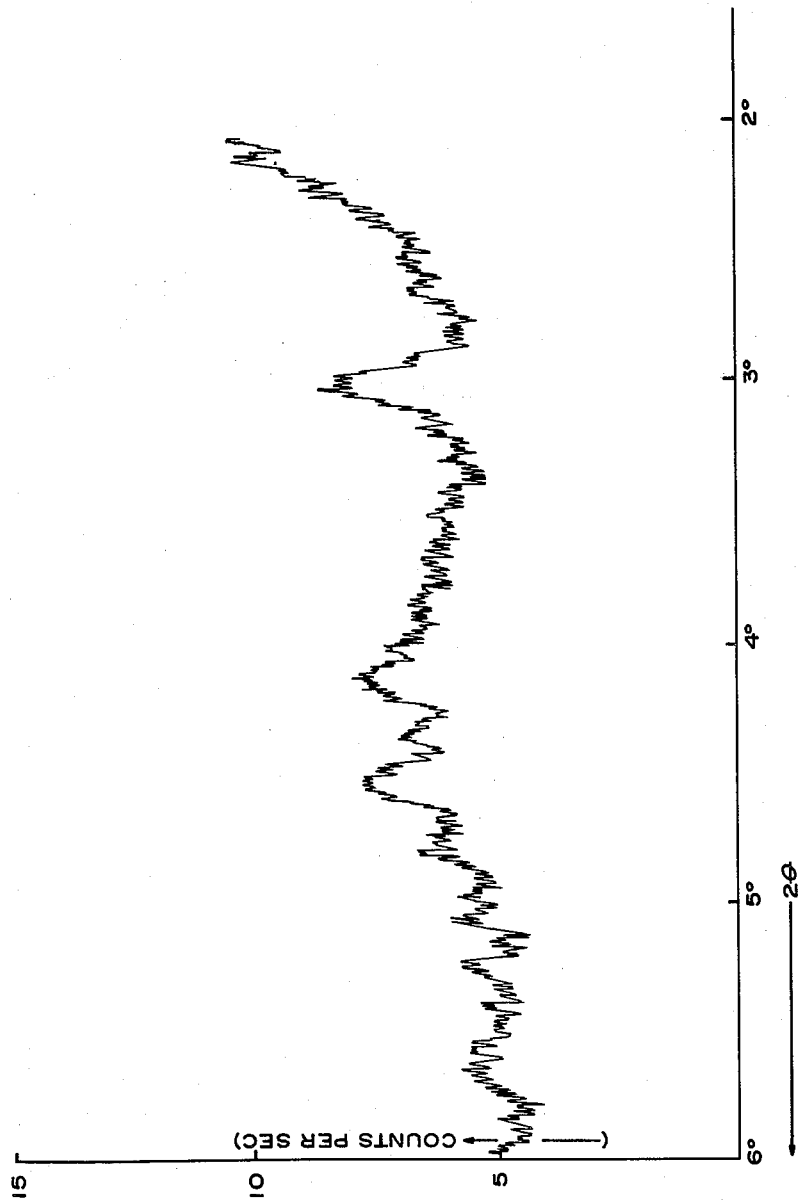

While the first above-described stage must be considered an ion-exchange process, the second stage can be explained as yielding compounds of interstitial or superphase structures, and the third stage as an absorption stage leading to the formation of double salts or additive compounds. The formation of these different groups of compounds was not to be expected, since the entire reaction seems to follow an adsorption isotherm as described by K. Marcker in "Acta Chemica Scandinavica" 13 (1959), particularly FIG. 1 on 2037.

The process of my invention is also applicable to the formation of novel metal-insulin compounds containing anions in which a large portion of the zinc, or substantially all, has been replaced by other metals, namely calcium, magnesium, cadmium, manganese, iron, nickel or cobalt. Some of the compounds prepared in this manner are defined by the following formulas:

(Insulin)$_3$Zn.Mn$_5$.(MnCl$_2$)$_7$(MnCl$_2$) zinc-dodecamangano-tetradecachloro-insulin (Insulin)$_3$Zn.Cd$_5$.(CdCl$_2$)$_5$ zinc-decacadmium-decachloro-insulin (Insulin)$_3$Co$_2$(CoCl$_2$)$_6$ octa-cobalto-dodeca-chloro-insulin The starting material for the formation of these new metal insulin compounds containing metals other than zinc is preferably a zinc-insulin having at least the well known minimum zinc content required for crystallizing insulin. The starting zinc-insulin is suspended in an organic solution of the other metal compound, for instance, nickel chloride, manganese-(II)-chloride, cadmium chloride, cobaltous chloride, or ferrous chloride, or the respective soluble salts of other monovalent ions such as bromide or iodide.

Table 3 below gives the chemical composition and X-ray characterization of compounds formed when crystalline zinc-insulin is suspended in an ethanolic solution of another heavy metal chloride.

| Metal chloride | Me atoms/unit | Zn atoms/unit | a (A.) | c (A.) |
|---|---|---|---|---|
| NiCl$_2$ | 2.8 | 0.5 | 76.5 | 33.6 |
| MnCl$_2$ | 8.8 | 0.4 | 77.3 | 34.1 |
| CdCl$_2$ | 5.4 | 0.3 | 71 | 34 |
| CoCl$_2$ | 7.8 | 0.1 | | |
| Untreated | 0 | 0.7 | 74.1 | 32.4 |

The practical importance of the invention is, that when in the treatment of diabetic patients one uses the produced aqueous metalinsulin suspensions—either of crystalline or amorphous insulin as well as mixtures of these insulin forms—with a metal content that one practically oneself can choose, and which e.g. in the case of zinc lies above the hitherto known maximum and used content of 2.2–2.3%, by varying the bound quantity of metal, one can obtain an undreamt of, durable controllable retarded effect of insulin preparations, for instance of 72 hours and longer.

One has thus found a quite considerable retarded effect, already with preparations with above 2.5 to about 4.5% (calculated on the weight of insulin) chemically bound zinc in the new zinc insulin crystals or in corresponding amorphous zinc insulin in suspension.

Without being bound to the exact atomic arrangement of the elementary cells of the new zinc-insulin compounds, all presently available data point to the following structural arrangement of the metal atoms relative to the characteristic histidyl groups in the new zinc insulins of above 2 to 8 zinc atoms according to Formula 1 as compared with the known zinc insulins which may comprise an arrangement according to Formula 2:

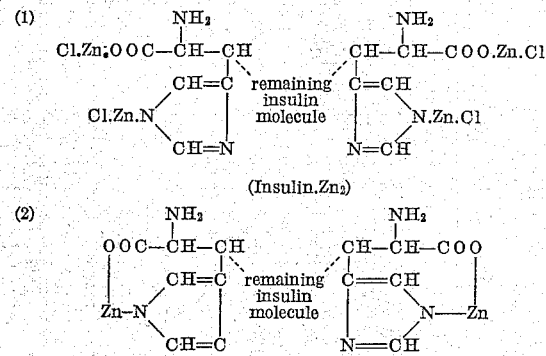

My invention is further illustrated but not limited by a number of examples given hereinafter. All percentages are by weight and based on the total weights of the resulting new zinc insulins.

*Example 1*

1 g. of crystalline insulin is suspended in 100 ml. of absolute ethyl alcohol containing 5 mg. zinc per ml. in the form of zinc chloride. After stirring for two hours, the resulting crystals are isolated by filtration, washed with ethyl alcohol and dried. They contain about 5% of zinc and about 3.3% of chlorine based on the total weight of the resulting zinc insulin.

As an alternative the crystals may be isolated by centrifugal separation. The above zinc content corresponds to about 5 atoms of zinc per insulin weight. The formula $Insulin.Zn_5Cl_6$ or written in a different manner, $Insulin.Zn_2(Zn_2Cl_2)_3$ can thus be attributed to the above obtained new compound. The molecular weight based on a weight of the insulin portion of 6000 is about 6540 for the unassociated molecule.

*Example 2*

1 g. of crystalline insulin as used in Example 1 is suspended in 100 ml. of absolute ethyl alcohol containing 2.5 mg. zinc per ml. in the form of zinc chloride. After stirring for two hours the resulting crystals are isolated as above, washed with ethyl alcohol and dried. They contain about 4% of zinc and about 2% of chlorine. The molecular weight is about 6380 for the unassociated molecule. The formula of this compound is written approximately as $Insulin.Zn_4Cl_4$ or $Insulin.Zn_2(Zn_2Cl_2)_2$; $m$ in the Equation III given hereinbefore being 1.93.

*Example 3*

1 g. of crystalline insulin as used in Example 1, is suspended in 100 ml. absolute ethyl alcohol containing 5 mg. zinc per ml. in the form of zinc chloride. After stirring for two hours the resulting crystals are isolated as above, washed with ethyl alcohol and dried. They contain about 3.5% of zinc and about 1.6% of chlorine. The molecular weight is about 6340 for the unassociated molecule, $m$ being 1.4.

*Example 4*

1 g. of crystalline insulin is suspended in 100 ml. absolute ethyl alcohol containing 3 mg. zinc per ml. in the form of zinc chloride. After stirring for two hours the crystals are isolated as above, washed with ethyl alcohol and dried. They contain about 3% of zinc and about 1% of chlorine; the molecular weight of the unassociated molecule is about 6250. If only 1 mg. zinc per ml. is used the resulting crystals contain only about 1.5 percent of zinc and no chlorine at all.

*Example 5*

1 g. crystalline insulin is suspended in 100 g. molten, anhydrous phenol containing 1 percent zinc in the form of $ZnCl_2$. After stirring for two hours, an equal volume of ethyl alcohol is added, the crystals are isolated as above, washed with ethyl alcohol and dried. The crystals contain about 5 percent zinc and about 3.3% of chlorine.

*Example 6*

1 g. crystalline insulin is suspended in 100 ml. benzyl alcohol containing 20 mg. zinc in the form of $ZnCl_2$. After stirring for two hours the crystals are isolated as above, washed with ethyl alcohol and dried. The resulting crystals contain only about 2 percent zinc and no chlorine. The example is repeated augmenting the zinc content in the solution to 40 mg. Crystals are obtained which contain about 4 percent of zinc and about 2.1% of chlorine.

*Example 7*

1 g. crystalline insulin is suspended in 100 ml. acetone containing 5 mg. zinc per ml. in the form of zinc chloride. After stirring for two hours the crystals are isolated as above, washed with acetone and dried. The crystals contain about 5% of zinc and about 3.25% of chlorine.

*Example 8*

1 g. crystalline insulin is suspended in 100 ml. of a mixture of alcohol and water containing 35 percent by volume of ethyl alcohol. The mixture contains 10 mg. zinc per ml. in the form of zinc chloride. The solution has a pH-value of 4.5. After stirring for two hours the crystals are isolated as above, washed with ethyl alcohol and dried. The crystals have a zinc content of about 3.5 percent and about 1.6% of chlorine.

If the alcohol-water mixture contains 20 percent by volume of ethyl alcohol and 1 mg. zinc per ml., and the process is performed at a pH-value of 4.7 the resulting zinc-insulin crystals show only a zinc content of about 1.7 percent, but no chlorine content.

*Example 9*

1 g. crystalline insulin is suspended in 100 ml. of a mixture of alcohol and water containing 15 percent by volume of ethyl alcohol. The mixture contains 10 mg. zinc per ml. in the form of zinc chloride. After stirring for two hours the crystals are isolated as above, washed with ethyl alcohol and dried. The resulting crystals show a zinc content of only about 2 percent, but no chlorine, due to the high water content of the solvent.

*Example 10*

1 g. crystalline insulin is suspended in 100 ml. of a mixture of alcohol and water containing 50 percent by volume of ethyl alcohol. The mixture contains 10 mg. per ml. of zinc in the form of zinc chloride. To the mixture is added a solution of $NH_3$—$NH_4Cl$ in order to obtain a pH-value of 7. After two hours' stirring the crystals are isolated as above, washed with ethyl alcohol and dried. The crystals contain about 7 percent zinc and about 5.3% of chlorine. The molecular weight of the new zinc insulin is about 6860 for the unassociated molecule which corresponds approximately to the formula insulin.Zn$_2$(ZnCl$_2$)$_{5.4}$.

*Example 11*

1 g. crystalline insulin is suspended in 100 ml. of a mixture of water and alcohol containing 35 percent by volume of ethyl alcohol. The mixture contains 10 mg. zinc per ml. in the form of zinc chloride. To the mixture is added a solution of NH$_3$—NH$_4$Cl in order to obtain a pH-value of 7. After stirring for two hours the crystals are isolated as above, washed with ethyl alcohol and dried. The crystals contain about 5.5 percent zinc and about 3.5% of chlorine.

*Example 12*

1 g. crystalline insulin is suspended in 100 ml. of a mixture of alcohol and water containing 15 percent by volume of ethyl alcohol. The mixture contains 10 mg. zinc per ml. in the form of zinc chloride. To the mixture is added a solution NH$_3$—NH$_4$Cl in order to obtain a pH-value of 7. After two hours' stirring the crystals are isolated as above, washed with ethyl alcohol and dried. The crystals contain about 5 percent zinc and about 3.3% of chlorine.

*Example 13*

1 g. crystalline insulin is suspended in 100 ml. 30 weight percent aqueous ethyl alcohol, containing 2.3 mg. zinc per ml. in the form of zinc chloride and having a pH-value of 4.4. The insulin is partly dissolved. The undissolved portion of the crystals are separated by filtration, washed with ethyl alcohol and dried. They contain 2.2 percent zinc. The pH-value of the filtrate is brought to 6.3. Amorphous insulin is precipitated and washed with ethyl alcohol and dried. The amorphous insulin has a zinc content of about 4.5 percent and about 2.75% of chlorine.

*Example 14*

1 g. of crystalline insulin is suspended in 100 ml. of absolute ethyl alcohol containing 5 mg. zinc per mil. in the form of zinc bromide. After stirring for three hours at room temperature (25° C.), the resulting crystals are insolated by filtration, washed with ethyl alcohol and dried. They contain about 5% of zinc and about 7.5% of bromine. The molecular weight of the new zinc insulin is about 6855 for the unassociated molecule. Its composition approximates the formula Insulin.Zn$_5$Br$_6$.

*Example 15*

Example 14 was repeated, but using zinc acetate instead of zinc bromide. The resulting crystals contained 5% zinc and about 2 of acetate ion.

In all the above examples amorphous insulin may be used instead of crystalline insulin.

Instead of zinc as used in the above examples calcium, magnesium, nickel, manganese, cadmium and cobalt may be used. The amounts of these metals thereby bound to the insulin correspond to the figures given in the above examples for zinc and also for instance to the figures appearing in Table 3.

What is claimed is:

1. A process for the production of crystalline zinc-insulin compounds having a content of monovalent anion selected from the group consisting of chloride, bromide and acetate corresponding stoichiometrically to two gram atoms of heavy metal less than the total amount of gram atoms of said heavy metal present in said metal-insulin compound per mole thereof, which process comprises reacting insulin with the salt of said monovalent anion and a heavy metal selected from the group consisting of zinc, calcium, manganese, cobalt, magnesium, iron, nickel and cadmium in a solvent for said salt, said solvent being chemically inert to insulin and to the formed metal-insulin compound and being selected from the group consisting of anhydrous lower alkyl alcohols, aqueous mixtures of lower alkyl alcohols, anhydrous lower aralkyl alcohols, unsubstituted and lower alkyl-substituted phenols, anhydrous pyridines, aqueous pyridine mixtures alone and in mixture with ammonia-ammonium chloride, lower mono- and di-basic fatty acids and mixtures of said fatty acids with water alone and together with an admixture of ammonia-ammonium chloride, the content of water in said mixtures with lower alkyl alcohols, with pyridines and with said fatty acids, respectively, being less than 85% by volume.

2. A process as described in claim 1 wherein the starting insulin is crystalline insulin.

3. A process a described in claim 1 wherein the starting insulin is amorphous insulin.

4. A process for the production of zinc-insulin containing from about 2.75 to about 8% by weight of chemically bound zinc and chlorine in stoichiometrically proportion to two gram atoms of zinc less than the total number of gram atoms of zinc present in said zinc-insulin per mole thereof, which process comprises reacting insulin with zinc chloride in solution in a solvent for the latter, said solvent being chemically inert to insulin and to the formed zinc-insulin and being selected from the group consisting of anhydrous lower alkyl alcohols, aqueous mixtures of lower alkyl alcohols, anhydrous lower aralkyl alcohol, unsubstituted and lower alkyl-substituted phenols, anhydrous primary lower alkyl amines, anhydrous pyridines, aqueous pyridine mixtures alone and in mixture with ammonia-ammonium chloride, lower mono- and di-basic fatty acids and mixtures of said fatty acids with water alone and together with an admixture of ammonia-ammonium chloride, the content of water in said mixtures with lower alkyl alcohols, with pyridines and with said fatty acids, respectively, being less than 85% by volume.

5. A process for the production of zinc-insulin containing from above 2.75 to about 8% by weight of chemically bound zinc and chlorine in stoichiometrical proportion to two gram atoms of zinc less than the total number of gram atoms of zinc present in said zinc-insulin per mole thereof, which process comprises reacting insulin with zinc chloride in absolute ethyl alcohol.

6. A process for the production of zinc-insulin containing from above 2.75 to about 8% by weight of chemically bound zinc and chlorine in stoichiometrical proportion to two gram atoms of zinc less than the total number of gram atoms of zinc present in said zinc-insulin per mole thereof, which process comprises reacting insulin with zinc chloride in solution in an aqueous ethyl alcohol solution containing about 15 to 50% by formula of ethyl alcohol.

7. A process for the production of zinc-insulin containing from above 2.75 to about 8% by weight of chemically bound zinc and chlorine in stoichiometrical proportion to two gram atoms of zinc less than the total number of gram atoms of zinc present in said zinc-insulin per mole thereof, which process comprises reacting insulin with zinc chloride in solution in an aqueous ethyl alcohol solution containing about 15 to 50% by volume of ethyl alcohol and ammonia-ammonium chloride.

8. A process for the production of zinc insulin containing 2.75 to 8% of chemically bound zinc, which comprises reacting insulin with zinc chloride in solution in a solvent for the latter, said solvent being chemically inert to insulin and to the formed zinc-insulin and being selected from the group consisting of absolute alcohol, ethyl alcohol, anhydrous benzyl, anhydrous phenol, aqueous ethyl alcohol containing more than 15% by volume of ethyl alcohol, and aqueous ethyl alcohol containing NH$_3$·NH$_4$Cl.

9. A process for the production of zinc insulin containing from 2.75 to 8% of chemically bound zinc, which comprises intimately admixing insulin with corresponding amounts of a soluble zinc salt in solution in a solvent selected from the group consisting of glacial acetic acid, lactic acid, glycolic acid and propionic acid, said solvent being inert to the insulin and to the resultant zinc insulin, and said solution containing less than 85% of water, whereby reaction takes place and the desired zinc insulin with 2.75 to 8% of chemically bound zinc separates out.

10. A process for the production of zinc insulin containing from 2.75 to 8% of chemically bound zinc, which comprises intimately admixing insulin with corresponding amounts of a soluble zinc salt and with $NH_3 \cdot NH_4Cl$ in solution in a solvent selected from the group consisting of glacial acetic acid, lactic acid, glycolic acid and propionic acid, said solvent being inert to the insulin and to the resultant zinc insulin, and said solution containing less than 85% of water, whereby reaction takes place and the desired zinc insulin with 2.75 to 8% of chemically bound zinc separates out.

11. A process for the production of zinc insulin containing from 2.75 to 8% of chemically bound zinc, which comprises intimately admixing insulin with a corresponding amount of a soluble zinc salt in solution in pyridine, said solution containing less than 85% of water, whereby reaction takes place and the desired zinc insulin with 2.75 to 8% of chemically bound zinc separates out.

References Cited in the file of this patent

UNITED STATES PATENTS

| | | |
|---|---|---|
| 2,882,202 | Peterson et al. | Apr. 14, 1959 |

FOREIGN PATENTS

| | | |
|---|---|---|
| 786,635 | Great Britain | Nov. 20, 1957 |

OTHER REFERENCES

Hallas-Møller et al., Science 116 (3015), pp. 394–396, Oct. 10, 1952.